United States Patent [19]

Setoguchi et al.

[11] Patent Number: 5,480,481
[45] Date of Patent: Jan. 2, 1996

[54] ALUMINUM PIGMENTS

[75] Inventors: Shunichi Setoguchi, Kashihara; Haruzo Katoh, Akashi; Takashi Matsufuji, Yamato-Koriyama, all of Japan

[73] Assignee: Toyo Aluminum Kabushiki Kaisha, Osaka, Japan

[21] Appl. No.: 298,279

[22] Filed: Aug. 31, 1994

Related U.S. Application Data

[63] Continuation-in-part of Ser. No. 99,483, Jul. 28, 1993, abandoned.

[30] Foreign Application Priority Data

Aug. 5, 1992 [JP] Japan ..................... 4-209079

[51] Int. Cl.$^6$ ...................... C09C 1/62
[52] U.S. Cl. ..................... 106/404; 106/403
[58] Field of Search ..................... 106/404, 403

[56] References Cited

U.S. PATENT DOCUMENTS

| | | | |
|---|---|---|---|
| 3,969,127 | 7/1976 | Robitaille et al. | 106/425 |
| 4,350,535 | 9/1982 | Ishijima et al. | 106/403 |
| 5,028,639 | 7/1991 | Treutlein et al. | 523/200 |
| 5,296,032 | 3/1994 | Jenkins et al. | 106/404 |
| 5,322,560 | 6/1994 | DePue et al. | 106/404 |
| 5,372,638 | 12/1994 | DePue et al. | 106/404 |

FOREIGN PATENT DOCUMENTS 0104075  3/1984  European Pat. Off. .

OTHER PUBLICATIONS

Database WPI Section Ch. Week 9252, Derwent Publications Ltd. London, GB, Class G01 AN 92–426415 & JP-A-4 318 181 (Nippon Paint Co.) 9 Nov. 1992 Abstract.
Database WPI, Section Ch. Week 8513, Derwent Publications Ltd., London, GB, Class G01, AN 85–077465 & JP-A-60 029 401 (Pentel K.K.) 14 Feb. 1985 Abstract.

*Primary Examiner*—Mark L. Bell
*Assistant Examiner*—Scott L. Hertzog
*Attorney, Agent, or Firm*—Nixon & Vanderhye

[57] ABSTRACT

Disclosed herein is an aluminum pigment comprising aluminum flakes, each of the aluminum flake being coated with molybdic acid in an amount of 0.1 to 10% by weight in terms of Mo based on Al. If desired, at least one selected from water-insoluble metal salts of molybdic acid and vanadium pentoxide in an amount of 0.1 to 10% by weight in terms of metal based on Al may be attached on the coatings of molybdic acid.

The aluminum pigment of the present invention has good color tone and good water resistance.

17 Claims, No Drawings

ALUMINUM PIGMENTS

CROSS-REFERENCE TO RELATED APPLICATIONS

This application is a continuation-in-part of earlier application Ser. No. 08/099,483 filed Jul. 28, 1993, abandoned.

FIELD OF THE INVENTION

The present invention relates to aluminum pigments which are incorporated into water base paints used for finish coating car bodies and the like and water base inks.

PRIOR ARTS

The aluminum pigments to be incorporated in the water base paints are described in many prior publications. However, processes for obtaining the aluminum pigments which can be incorporated in the water base paints used for finish coating the car bodies are described in only JP-B-01/54386, JP-A-59/74201 and JP-B-60/8057.

JP-B-01/54386 relates to a treatment with chromic acid. By this treatment, the aluminum pigment which has a good stability in the water base paint, which can inhibit the production of hydrogen gas and which is excellent in color tone can be obtained. When the aluminum pigment comprises fine aluminum flakes, however, this treatment causes the dissolution of the fine aluminum flakes. Thus, the aluminum pigment comprising the fine aluminum flakes having an average particle size ($D_{50}$) of less than 20 µm is hardly obtained. Further, this treatment causes industrial hygienic and environmental problems due to the use of Cr(VI) and therefore, its application is limited.

JP-A-59/74201 relates to a treatment with ammonium vanadate. By this treatment, the gas production is inhibited. However, this treatment causes the increase in thickness of a coating and the lowering in color tone and therefore, its application is limited.

JP-B-60/8057 relates to a treatment with a lauryl ester of phosphoric acid. By this treatment, the aluminum pigment which inhibits the gas production and has the good color tone can be obtained. This treatment gives an important defect to properties of the coating due to the presence of lauryl group on the surface of the coating. The coating having the defective property shows poor adhesion with a metallic base coating film and a top coating film, when the water base paint containing the resultant aluminum pigment is used for finish coating the car body according to a standard coating method such as a 2C1B coating method and a 2C2B coating method.

As described in the above, there is no prior art which can provide the aluminum pigment suitable for the incorporation in the water base paint used for finish coating the car body, which is excellent in the color tone, the stability in the water base paint and the coating property.

An object of the present invention is to provide the aluminum pigment suitable for the incorporation in the water base paint used for finish coating the car body, which is excellent in the color tone, the stability in the water base paint and the coating property.

SUMMARY OF THE INVENTION

Accordingly, the present invention provides an aluminum pigment suitable for a water base paint comprising aluminum flakes, the surface of each aluminum flake being coated with a coating of molybdic acid in an amount of 0.1 to 10% by weight in terms of Mo based on aluminum.

DETAILED DESCRIPTION OF THE INVENTION

The aluminum pigment according to the present invention is prepared by reacting the aluminum flakes with an alkaline aqueous solution containing ammonium molybdate, whereby the coatings of molybdic acid in an amount of 0.1 to 10% by weight in terms of Mo based on aluminum are formed on the aluminum flakes.

As the aluminum flakes, the aluminum flakes having the excellent color tone, that is, the aluminum flakes being rich in metallic luster which has average particle diameter ($D_{50}$) of about 1 to 50 µm, preferably about 10 to 30 µm can be used. These aluminum flakes are produced by grinding or milling using a grinding agent in the presence of a grinding medium in a suitable device such as a ball mill or an attritor mill. As the grinding agent, a higher fatty acid such as oleic acid, stearic acid, isostearic acid, lauric acid, palmitic acid and myristic acid; aliphatic amines; aliphatic amides; and aliphatic alcohols are generally used.

Desirably, the aluminum flakes to be treated is previously dispersed in a water-soluble solvent mentioned below so that they are easily wet with the alkaline aqueous solution containing ammonium molybdate as a treating solution. In case of that the grinding medium is incompatible with the treating solution, the grinding medium should be replaced with the water-soluble solvent prior to the treatment.

Usable ammonium molybdate is either of ortho-, meta- or para-molybdate. Alkali metal molybdate which is also water-soluble is not preferable for the treatment of the aluminum flakes, because of its high alkaline strength. Further, if the alkali metal remains in the coating, the remaining alkali metal may affect the coating properties. In the preparation of the treating solution, ammonium molybdate is preferably dissolved in a mixture of water and the water-soluble solvent so that it is contained at the concentration of a few % or less. The water-soluble solvent is essential for effecting the contact of the aluminum flakes and ammonium molybdate.

Usable water-soluble solvent includes ethylene glycol monobutyl ether(butyl cellosolve), diethylene glycol monobutyl ether, propylene glycol monomethyl ether, propylene glycol monopropyl ether and isopropyl alcohol.

When the aluminum flakes are contacted with the treating solution, the treating solution should be alkaline. In general, the pH of the treating solution is 7 to 10, preferably 7.5 to 9.5, more preferably 8 to 9 and most preferably 8.3 to 8.9. When the pH is less than 7, the reaction of aluminum with molybdate proceeds very slowly, perhaps due to the presence of the grinding agent such as the fatty acid adsorbed on the surfaces of the aluminum flakes. Of course, when the treating solution has the acidic pH which is out of the passive zone, the dissolution of aluminum is happened. On the other hand, when the pH of the treating solution is above 10, rapid reaction is effected and as a result, the aluminum pigment excellent in the color tone cannot be obtained.

The reaction is completed by removing the water and unreacted reactants from a reaction system. After the reaction has been completed, a reaction product is washed and filtered. If necessary, the resultant residue is dispersed in the water-soluble solvent so as to store stably.

The amount of the resultant coating of molybdic acid is in the range of 0.1 to 10% by weight in terms of Mo based on aluminum. When it is less than the lower limit, the inhibition of the gas production is insufficient. On the other hand, when it is above the upper limit, the coating is too thick and as the result, the color tone is impaired. Preferable amount is 0.1 to 3% by weight.

As shown in the following examples, the aluminum pigment having the desired properties can be obtained by treating the aluminum flakes with an alkaline aqueous solution containing ammonium molybdate (hereinafter referred to as "first treatment"). By subjecting the aluminum pigment prepared in the first treatment to a second treatment mentioned below, the aluminum pigment having the desired properties can be obtained more certainly.

The second treatment comprises mixing and kneading the first-treated aluminum pigment with a second treating agent selected from water-insoluble metal salts of molybdic acid and vanadium pentoxide so that 0.1 to 10% by weight of the treating agent in terms of metal based on aluminum is attached on the above coating of molybdic acid. When the first-treated aluminum pigment contains water, the water is preferably replaced with the water-soluble solvent before the first-treated aluminum pigment is subjected to the second treatment.

Usable water-insoluble metal salts of molybdic acid as the second treating agent include basic zinc salt, magnesium salt, calcium salt, strontium salt and barium salt. The second treating agent is powder, generally having average particle size of about 1 to 10 μm. It is used after dispersing in a small amount of the water-soluble solvent.

The powdery second treating agent together with the first-treated aluminum pigment are dispersed in the water-soluble solvent followed by mixing and kneading, thereby the powder of the second treating agent is attached on the coatings of the molybdic acid formed in the first treatment. The amount of the powdery second treating agent attached on the coating of molybdic acid by the second treatment is in the range of 0.1 to 10% by weight in terms of metal based on aluminum. When it is less than the lower limit, the advantage of the second treatment cannot be obtained. On the other hand, when it is above the upper limit, the attached amount of the powdery second treating agent is too much and as the result, the color tone is impaired. Preferable amount is 1 to 8% by weight.

Usually, the powdery second treating agent used is not completely attached on the coating of molybdic acid. Because the second treating agent itself is stable in the water base paint and does not affect the coating properties, the powdery second treating agent in unattached condition may be present during the preparation of the water base paint.

For increasing the attached amount of the powdery second treating agent on the coatings of molybdic acid, it is preferable to contact the first-treated aluminum pigment with an aqueous solution of ammonium phosphate or an alcoholic solution of lower alkyl ester of orthophosphoric acid after forming the coatings of molybdic acid, for example during the washing of the first-treated aluminum pigment. It is assumed that by such a contact, phosphate (—P—OH) groups are adsorbed on the coatings of molybdic acid, thereby the adhesion of the powdery second treating agent to the coatings of molybdic acid can be increased. Alternatively, the surface of the second treating agent may be modified with the phosphate (—P—OH) groups prior to the use.

The second-treated aluminum pigment has a structure that the coatings of molybdic acid in an amount of 0.1 to 10% by weight in terms of Mo based on aluminum are formed on the aluminum flakes and further at least one of the powdery second treating agent selected from the water-insoluble metal salts of molybdic acid and vanadium pentoxide in the amount of 0.1 to 10% by weight in terms of metal based on aluminum is attached on the coatings of molybdic acid.

The aluminum pigment of the present invention is incorporated in any of the water base paint. The type of the water base resin constituting the water base paint is classified into a water soluble resin, a water dispersible resin and an emulsifiable resin. The nature of the water base resin includes a combination of acrylic and melamine resins, a combination of polyester and melamine resins, urethane resin and CAB resin. The type and the nature of the water resin to which the aluminum pigment of the present invention is applied is not limited. Of course, the water base paint in which the aluminum pigment of the present invention is incorporated is coated by any coating method. The known coating methods such as an air spray coating, an airless spray coating and a roller coating can be used.

According to the present invention, by treating the aluminum flakes with the alkaline aqueous solution containing ammonium molybdate in the first treatment, the coatings of molybdic acid which is excellent in water resistance can be formed on the aluminum flakes without lowering the intrinsic color tone of the aluminum pigment due to the slow reaction with the alkaline aqueous solution containing ammonium molybdate. And, by subjecting the first-treated aluminum pigment to the second treatment using the powdery second treating agent selected from the water-insoluble metal salt of molybdic acid and vanadium pentoxide, the powders of the second treating agent are attached on the coatings of molybdic acid, thereby the water resistance of the aluminum pigment can be further improved. The water base paint in which the second-treated aluminum pigment is incorporated is very excellent in storage stability, as compared with the prior water base paints. As clear from the following examples, the treatment according to the present invention does not cause the lowering of the coating properties and therefore, the aluminum pigment of the present invention is suitable for incorporating in the water base paint used for finish coating the car bodies. The aluminum pigment of the present invention can be incorporated in oil paints without showing any inconvenience.

The aluminum pigment of the present invention which is mainly coated with molybdic acid can be used with no environmental problem.

EXAMPLES

The following examples will more fully illustrate the present invention.

Examples 1 to 2

Aluminum flakes (Alpaste (trade name) 7670NS, $D_{50}=15$ μm, produced by Toyo Aluminum K.K.) was weighed so that 200 g in terms of Al was present and placed in a beaker (3 liters), to which 1 l of propylene glycol monomethyl ether was added followed by stirring at 400 r.p.m., thereby a dispersion of aluminum flakes was prepared. The whole was cooled to 18° C. Independently, a predetermined amount of ammonium paramolybdate $(NH_4)_6Mo_7O_{24}.4H_2O$ was dissolved in 200 ml of demineralized water, thereby the treating solution was prepared.

To the dispersion of aluminum flakes, the treating solution was added dropwise and they were reacted for 1 hour at a predetermined pH at a liquid temperature of 10° to 20° C. Preferably, while stirring at 400 to 450 r.p.m. The amount of ammonium paramolybdate and pH on the treatment are shown in Table 1.

Then, a reaction product was decanted with the demineralized water three times so as to remove $NH_4$ ions and unreacted ammonium paramolybdate and filtered through a glass filter with suction. Then, the aluminum flakes on the filter were washed with propylene glycol monomethyl ether three times so as to completely remove the water and finally filtered with suction, thereby a first-treated aluminum pigment was obtained.

Examples 3 to 10 and Comparative Example 1 to 2

After redispersing the first-treated aluminum pigment (200 g in terms of Al) obtained in each of the above Examples in 108 g of propylene glycol monomethyl ether, a resultant dispersion was transferred into a kneader, to which a predetermined amount of a second treating agent previously dispersed in a small amount of propylene glycol monomethyl ether was added, and then mixed and kneaded for 30 minutes. The second treating agent used is shown in Table 1.

In Comparative Example 1, a commercially available aluminum pigment treated with chromic acid (STAPA HYDROLUX (trade name) 400, $D_{50}$=23 μm, produced by Eckart-Werke AG) was used.

In Comparative Example 2, the aluminum flakes (Alpaste (trade name) 7670NS) used in Example 1 was used after replacing water with isopropyl alcohol.

In Comparative Example 3, the aluminum flakes treated in the same manner as Example 1, provided that 1 l of propylene glycol monomethyl ether was replaced with 1 l of propylene glycol monopropyl ether containing acetic acid (conc. 190 ppm) so that the reaction of aluminum with molybdate was conducted at pH 5.8, was used.

TABLE 1

| | first treatment | | second treatment | |
|---|---|---|---|---|
| | ammonium p-molybdate (wt %) | pH | treating agent | amount (wt %) |
| Ex. 1 | 2.5 | 8.3 | — | — |
| Ex. 2 | 5.0 | 8.9 | — | — |
| Ex. 3 | 2.5 | 8.3 | Mo—Ca* | 5.0 |
| Ex. 4 | 5.0 | 8.9 | Mo—Ca* | 5.0 |
| Ex. 5 | 2.5 | 8.3 | Mo—Zn* | 5.0 |
| Ex. 6 | 5.0 | 8.9 | Mo—Zn* | 5.0 |
| Ex. 7 | 2.5 | 8.3 | LF MC400WR** | 5.0 |
| Ex. 8 | 2.5 | 8.3 | Mo—Ba* | 5.0 |
| Ex. 9 | 2.5 | 8.3 | Mo—Sr* | 5.0 |
| Ex. 10 | 2.5 | 8.3 | $V_2O_5$ | 5.0 |
| Comp. Ex. 1 | — | — | — | — |
| Comp. Ex. 2 | — | — | — | — |
| Comp. Ex. 3 | 2.5 | 5.8 | — | — |

*Mo—Ca, Mo—Zn, Mo—Ba and Mo—Sr are calcium salt, zinc salt, barium salt and strontium salt of molybdic acid, respectively.
**trade name (Zn—Ca salt of molybdic acid, ex. Kikuchi Color and Chemicals Corporation)

Test

The stability of the aluminum pigment obtained in each of Examples 1 to 10 and Comparative Examples 1 to 3 in the water base metallic paint and the finish coating prepared from the same paint and the top clear paint were tested.

| Formulation of water base metallic paint for base coating film: | |
|---|---|
| water soluble acrylic resin (Almatex (trade name) WA 911, produced by MITUSI TOATSU CHEMICALS INC.) | 28.16 g |
| triethylamine | 1.14 g |
| demineralized water | 44.8 g |
| melamine resin (Cymel 350, produced by MITSI CYANAMID) | 4.4 g |
| isopropyl alcohol | 3.0 g |
| transparent iron oxide (SICOTRANS (trade name) RED L1275D, produced by BASF) | 5.0 g |
| aluminum pigment (as Al) | 3.0 g |
| Formulation of oily clear paint for top coating film: | |
| acrylic resin (Almatex (trade name) 110, produced by MITUSI TOATSU CHEMICALS INC.) | 140.0 g |
| melamine resin (Uban (trade name) 20SE60, produced by MITUSI TOATSU CHEMICALS INC.) | 50.0 g |
| Solvesso 100 | 60.0 g |

Coating Method

A steel plate previously electrodeposited with a primer was coated with the above paints in order using a SA-71 spray gun (IWATA TOSOKI KOGYO K.K.) and an automatic air coating device Model 310741 (SPRAYMATION INC.) according to the 2C1B coating method, thereby a test piece was prepared. That is, the steel plate was coated with the water base metallic paint for base coating film so that the dried film had 13 μm in thickness and then previously dried in an air oven of 90° C. for 10 minutes. Next, the oily clear paint for top coating film was coated so that the dried film had 40 μm in thickness followed by baking to cure in the air oven of 140° C. for 30 minutes.

Stability in the Water Base Paint 80 grams of the water base metallic paint was introduced in a flask, which was set on a water bath whose temperature was controlled to be 50° C. The cumulative volume of hydrogen gas produced for 7 days was determined. In Comparative Examples 2 and 3, the cumulative volume of hydrogen gas produced for 1 day was determined.

The lower the cumulative volume of hydrogen gas is, the higher the stability of the pigment in the paint is.

Coating Properties

For testing the accelerated humidity resistance, the resultant finished film of the test piece was stored at the temperature of 50° C. and the humidity of 98% or more for 10 days. The changes in the color tone and the adhesion of the metallic film with the top clear film before and after the storage of the test piece were determined.

The color tone (metallic luster IV value) of the metallic film was determined using a color measurement machine (ALCOPE (trade name) Model LMR-100, KANSAI PAINT CO., Ltd.). A desired metallic film stably shows the IV value higher than that in Comparative Example 2. The adhesion was determined in accordance with ASTM D3359 B (6 ranks). 3B or more is evaluated to be acceptable. The results are shown in Table 2.

TABLE 2

|  | stability | coating properties | | | |
|---|---|---|---|---|---|
|  | gas volume | before | | after | |
|  | (ml) | IV | adhesion | IV | adhesion |
| Ex. 1 | 3.0 | 202 | 5B | 205 | 4B |
| Ex. 2 | 2.0 | 195 | 5B | 196 | 4B |
| Ex. 3 | 0.5 | 197 | 5B | 198 | 5B |
| Ex. 4 | 0.0 | 185 | 5B | 185 | 5B |
| Ex. 5 | 0.5 | 195 | 5B | 195 | 5B |
| Ex. 6 | 0.0 | 187 | 5B | 186 | 5B |
| Ex. 7 | 0.5 | 198 | 5B | 199 | 5B |
| Ex. 8 | 0.5 | 198 | 5B | 198 | 4B |
| Ex. 9 | 0.5 | 190 | 5B | 192 | 4B |
| Ex. 10 | 0.5 | 195 | 5B | 195 | 4B |
| Comp. Ex. 1 | 1.0 | 193 | 4B | 195 | 3B |
| Comp. Ex. 2 | >20 | 305 | 5B | 282 | 5B |
| Comp. Ex. 3 | >20 | 197 | 5B | 173 | 4B |

As shown in the above Table, the aluminum pigments of Examples 1 and 2 prepared by subjecting to only the first treatment showed very good color tone which was maintained after the test of accelerated humidity resistance. The aluminum pigments of Examples 3 to 10 prepared by subjecting the aluminum pigments of Examples 1 and 2 to the second treatment showed good color tone which was maintained after the test of accelerated humidity resistance. In addition, in the aluminum pigments of Examples 3 to 10, the volume of hydrogen gas produced is negligible. On the other hand, the aluminum pigment of Comparative Example 2 which was subjected to no treatment produced a large volume of hydrogen gas and as the result, its stability in the water base paint is very poor. The aluminum pigment of Comparative Example 1 which is the commercially available aluminum pigment treated with chromic acid produced a minor volume of hydrogen gas and showed good color tone, but the adhesion between the base coating film with the top coating film was slightly inferior. It had the tendency of showing the lowered adhesion after the test of accelerated humidity resistance. The lowering in adhesion is assumed to be due to the presence of a slight amount of residual chromic (VI) acid. The aluminum pigment of Comparative Example 3 which was obtained by reacting at an acidic condition produced a large volume of hydrogen gas, because it had an insufficient coatings of molybdic acid.

Quantitative determination of Metal Content

The aluminum pigment was washed with acetone followed by powdering. After drying at 250° C. for 15 minutes, the resultant powder was quantitatively determined by ICP analysis. The results are shown in Table 3.

TABLE 3

|  | Al | Mo | Ca | Zn | Ba |
|---|---|---|---|---|---|
| Ex. 1 | 98.932 | 0.632 | 0.000 | 0.000 | 0.000 |
| Ex. 4 | 96.433 | 1.702 | 1.333 | 0.000 | 0.000 |
| Ex. 5 | 97.027 | 1.712 | 0.000 | 1.071 | 0.000 |
| Ex. 7 | 96.734 | 0.814 | 1.625 | 0.421 | 0.000 |
| Ex. 8 | 97.006 | 1.297 | 0.000 | 0.000 | 1.516 |
| Comp. Ex. 2 | 99.765 | 0.000 | 0.000 | 0.000 | 0.000 |
| Comp. Ex. 3 | 99.748 | 0.056 | 0.000 | 0.000 | 0.000 |

The content of Al was calculated by substracting the total amount of metals other than Al such as Mo. Zn, Ca, Ba, V, Fe, Si, Cu and Ti from 100.

What is claimed is:

1. An aluminum pigment comprising aluminum flakes, each of the aluminum flakes being coated with molybdic acid in an amount of 0.1 to 10% by weight in terms of Mo based on the weight of Al.

2. An aluminum pigment as claimed in claim 1, which is a paste containing propylene glycol monomethyl ether as a volatile component.

3. An aluminum pigment comprising aluminum flakes, each of the aluminum flakes being coated with molybdic acid in an amount of 0.1 to 10% by weight in terms of Mo based on the weight of Al so as to form coatings of molybdic acid, on which a water-insoluble metal salt of molybdic acid in an amount of 0.1 to 10% by weight in terms of metal based on the weight of Al is attached.

4. An aluminum pigment as claimed in claim 3, which is a paste containing propylene glycol monomethyl ether as a volatile component.

5. A method for preparing an aluminum pigment comprising aluminum flakes, comprising reacting the aluminum flakes with an alkaline aqueous solution containing ammonium molybdate at a temperature in the range of 10° to 30° C. so as to form on the aluminum flakes coatings of molybdic acid containing 0.1 to 10% by weight in terms of Mo based on the weight of Al.

6. A method as claimed in claim 5, wherein the reaction temperature is in the range of 15° to 20° C.

7. A method as claimed in claim 5, wherein the aluminum flakes are dispersed in at least one water-soluble solvent selected from the group consisting of ethylene glycol monobutyl ether, diethylene glycol monobutyl ether, propylene glycol monomethyl ether, propylene glycol monopropyl ether and isopropyl alcohol.

8. A method as claimed in claim 5, wherein the alkaline aqueous solution containing ammonium molybdate is added to the aluminum flakes or of aluminum flakes dispersion.

9. A method as claimed in claim 5, wherein ammonium molybdate is ammonium paramolybdate.

10. A method as claimed in claim 5, wherein the reaction is conducted at pH 7 to 10.

11. A method as claimed in claim 10, wherein the reaction is conducted at pH of 8.3 to 9.8.

12. A method for preparing an aluminum pigment comprising aluminum flakes, said method comprising the steps of:

(a) reacting the aluminum flakes with an alkaline aqueous solution containing ammonium molybdate at a temperature in the range of 10° to 30° C. so as to form on the aluminum flakes coatings of molybdic acid containing 0.1 to 10% by weight in terms of Mo based on the weight of Al, and then (b) mixing and kneading the thus coated aluminum flakes with a water-insoluble metal salt of molybdic acid thereby forming said water-insoluble metal salt of molybdic acid on said coated aluminum flakes in an amount of 0.1 to 10% by weight in terms of metal based on the weight of Al.

13. A method as claimed in claim 12, wherein the reaction temperature is in the range of 15° to 20° C.

14. A water base metallic paint comprising the aluminum pigment of claim 1.

15. A water base metallic paint comprising the aluminum pigment of claim 3.

16. A metallic coating film composition comprising the aluminum pigment of claim 1.

17. A metallic coating film composition comprising the aluminum pigment of claim 3.

* * * * *

UNITED STATES PATENT AND TRADEMARK OFFICE
CERTIFICATE OF CORRECTION

PATENT NO. : 5,480,481
DATED : January 2, 1996
INVENTOR(S) : SETOGUCHI et al

It is certified that error appears in the above-indentified patent and that said Letters Patent is hereby corrected as shown below:

ON THE TITLE PAGE:

At [73] The assignee should be --Toyo Aluminium Kabushiki Kaisha--.

Signed and Sealed this

Sixth Day of August, 1996

Attest:

BRUCE LEHMAN

Attesting Officer

Commissioner of Patents and Trademarks